United States Patent Office 2,816,010
Patented Dec. 10, 1957

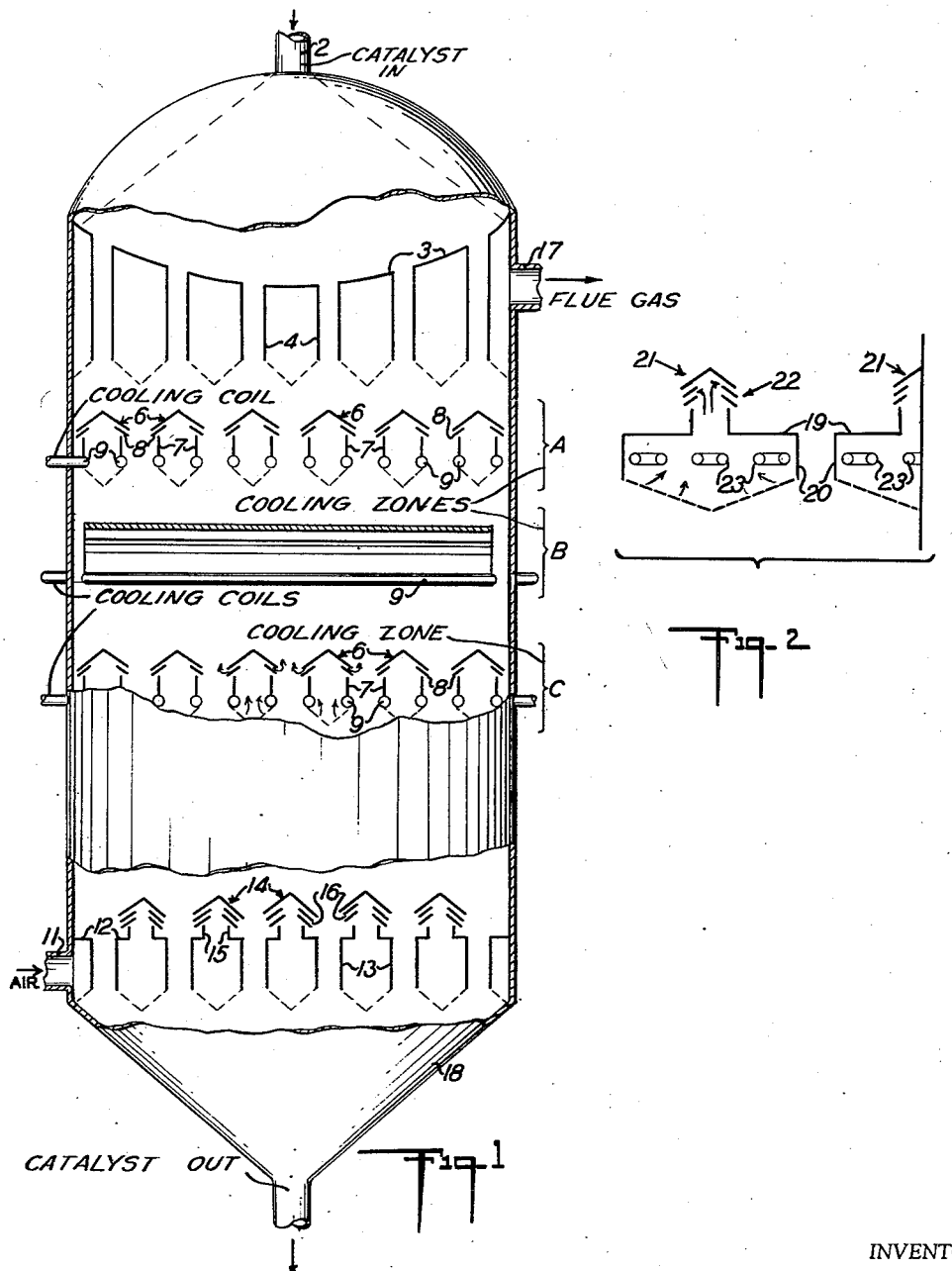

2,816,010

TEMPERATURE CONTROL OF EXOTHERMIC REACTIONS

Hubert A. Shabaker, Media, Pa., assignor to Houdry Process Corporation, Wilmington, Del., a corporation of Delaware Application May 4, 1951, Serial No. 224,592

5 Claims. (Cl. 23—288)

This invention relates to the regeneration of catalyst employed in the cracking of hydrocarbons, and more particularly to the control of the temperature developed during the catalyst regeneration.

As is known by those familiar with the art of cracking hydrocarbons, one commercially successful method is to employ a continuously recycled catalyst. In systems of this type, the catalyst is contacted with hydrocarbons at suitable temperatures to insure cracking. During the cracking stage a hydrocarbonaceous deposit, called "coke," is formed in the catalyst, tending to reduce the catalytic activity. In order to accomplish efficient cracking, it is necessary to remove the coke from the catalyst, which is generally done by passing the catalyst containing the coke through a regenerator. During the regeneration stage, the catalyst is treated with an oxidizing gas, preferably air, at suitable temperature to burn off the coke, leaving relatively coke free catalyst which may be recycled to the reactor stage for further contact with hydrocarbons to be cracked. As a result of the combustion between the oxygen of the air and the coke, temperatures in the regenerator, if not controlled, may go as high as 1700–2000° F. or higher, depending upon the degree of combustion. It has been found that when catalysts employed in cracking processes are subjected to temperatures above about 1100° to 1300° F., they undergo degradation and loss of activity. It is also known that excessive temperatures within a kiln will tend to warp and burn elements of the kiln structure.

It is a primary object of the present invention to control the temperature developed in a regenerator kiln to within those limits which will prevent catalyst degradation and kiln structure deterioration.

Another object is the provision of a new and novel method and apparatus for reducing the heat content of the materials moving within the kiln.

The invention, then, comprises the features hereinafter fully described and as particularly pointed out in the claims, the following description and annexed drawings setting forth in detail certain illustrative embodiments of the invention, these being indicative of but one of a number of ways in which the principles of the invention may be employed.

In said drawings:

Figure 1 is an elevational view, partly in diagram and partly in section, of a regenerator kiln employing the teachings of the present invention; and Figure 2 is a diagrammatic elevation of the apparatus of a modified cooling zone.

Referring more particularly to Figure 1, the numeral 1 designates the housing of a catalyst regenerator or kiln having a catalyst supply line 2. Uniform distribution across the interior of the kiln of the incoming catalyst is provided by a transverse concave tube sheet 3 having a plurality of downcomers 4. Positioned below the downcomers 4 is an upper cooling zone A which is provided with a plurality of inverted channel-shaped members 6 disposed in adjacent parallelism.

Each of the inverted channel-shaped members 6 comprises an inverted V-shaped top element with a pair of depending and substantially parallel side-walls 7, the latter being provided with suitable louvers 8. Also employed in the cooling zone A is a cooling coil 9 which extends transversely of the housing of the regenerator and which, according to a permissive embodiment, is attached to the lower ends of the side-walls 7 of the inverted channel-shaped members 6.

A plurality of such cooling zones may be provided in the regenerator, depending on operating conditions. In the preferred embodiment each successive cooling zone has its elements disposed at right angles to the disposition of the elements of the next adjacent zone. Successively lower second and third cooling zones are designated in Figure 1 at B and C, respectively.

Air or other oxidizing gas is supplied to the regenerator kiln through line 11. Positioned slightly above the air inlet, there is shown a transverse tube sheet 12 provided with a plurality of downcomers 13. Extending upwardly from the tube sheet 12, there is shown a plurality of inverted channel-shaped members 14 which are disposed in adjacent parallelism. As shown in Figure 1, each of these inverted channel-shaped members 14 comprises an inverted V-shaped top element with a pair of depending and substantially parallel side-walls 15, each of the latter having suitable louvers 16 for permitting the egress of upwardly flowing gas. Withdrawing of gas from the regenerator is effected by means of a suitable outlet 17; and the regenerated catalyst is discharged through an inverted frusto-conical bottom portion 18.

In Figure 2 of the drawings a modified cooling zone is shown as comprising a transverse plate 19 having a plurality of downcomers 20. Extending upwardly from the transverse plate 19 is a plurality of inverted channel-shaped members 21, each of which comprises an inverted V-shaped top element with a pair of depending and substantially parallel side-walls, the latter being provided with suitable louvers 22 for enabling the egress of upwardly flowing gas.

According to the foregoing construction and arrangement, a chamber is formed beneath those portions of the transverse plate 19 which underlie the inverted channel-shaped members 21; and each of these chambers is provided with a coil 23 which is supplied with a suitable cooling medium such as steam, etc.

In operation: spent catalyst from a cracking stage enters the regenerator kiln through supply pipe 2 and rests temporarily on the transverse concave tube sheet 3. From the top of the tube sheet 3 the spent catalyst descends by gravity through downcomers 4 passing downwardly through the regenerator kiln in the form of a moving bed for ultimate discharge in a regenerated condition through the inverted frusto-conical bottom portion 18.

In order to remove the coke present on the spent catalyst, it is passed countercurrent with an oxidizing gas, preferably air, which enters through the line 11 and flows upwardly through the downwardly moving catalyst bed, the products of combustion being discharged from the regenerator through the aforementioned gas discharge outlet 17.

The air introduced to the regenerator through the gas line 11, and which may be at ambient temperature, enters the space immediately below the tube sheet 12 having the downcomers 13, and passes upwardly into the horizontally disposed adjacently parallel inverted channel-shaped members 14 from which it diffuses outwardly through the louvers 16 into the downwardly moving catalyst bed. The catalyst which has attained a relatively high temperature prior to entering this zone, now gives up a portion of its heat to the incoming air and is thereby cooled. The air continues upwardly through the catalyst bed oxidizing the coke and thereby picking up additional heat along with gaseous products of combustion. As previously mentioned, this accumulated heat produces certain undesirable results which the present invention overcomes by a separate cooling medium which removes the heat by passing in indirect heat exchange relationship with both the downwardly moving catalyst and the upwardly moving gas.

This cooling of the materials flowing in the regenerator is accomplished in zones A, B, and C. While three zones are shown in this particular embodiment, it is to be understood that any member of the zones may be employed consistent with the practical aspects and the desired results within a similar system.

The particular structure and operation of the embodiments herein described are of such nature that the pressure drop conditions existing directly beneath and within the inverted channel members 6 are appreciably less than the pressure drop status existing between and through adjacent channel members 6 so that in the normal course of flow of the rising gas the tendency of such gas is to seek these regions of lower pressure drop and thus flow into the channel members and subsequently out through the louvers 8 into a higher region of the gravitating bed of solids. The distinct advantage of this system over other systems wherein solids and gases without separation pass over a multiplicity of stacked heat exchange members lies mainly in the ability of the gas to move within the solids free region under the channel members in suitable heat exchange relation with cooling coils 9 in such fashion that appreciable temperature reduction of the gas is obtained. In the non-separated cooling set-up where catalyst and gas are commingled, this free movement of gas to obtain efficient heat exchange is obstructed to an appreciable extent by the presence of the solids; likewise the solid particles themselves have relatively poor heat exchange ability with themselves and the effect of heat exchange between solid particles adjacent the heat exchange coils is very poorly transmitted to solid particles not so adjacent.

The gases, thus cooled, upon introduction into the gravitating bed of solids are distributed relatively uniformly and rapidly throughout the catalyst thereabove and effect more efficient direct heat transfer with the solids through the intimate contact therewith than previously possible in the non-segregated system. However, the other system is not without some advantage which may likewise accrue with the present operation in that at least a portion of the catalyst passes in direct contact with heat exchange members 9 thereby obtaining an additional amount of temperature reduction in connection with total operation of the cooling zone. It may be noted likewise that due to the pressure drop conditions hereinabove described, little if any flow of gas occurs through the catalyst moving between the gas reintroduction level adjacent louvers 8 and the lower ends of the channel members 6. By discontinuing the flow of gases through the catalyst in this region, the combustion practically ceases or is reduced to a low level thus obviating any substantial rise in temperature and thus materially aiding in the prevention of excessive temperatures within the regeneration zone.

Referring to the modification of Figure 2, the upwardly flowing gases at elevated temperatures are separated from the downwardly moving catalyst bed and enter the space immediately below the transverse plate or partition 19 free of solids. It will thus be seen that only the gases are passed in heat exchange relationship with the cooling means 23, the catalyst flowing downwardly through downcomers 20 without contacting the coils. Following their entrance into the spaces provided with the cooling coils 23, the gases at a reduced temperature flow upwardly into the inverted channel-shaped members 21 and then outwardly into the catalyst through the louvers 22.

Various other modifications may be made without departing from the spirit and scope of the instant invention which is intended to be limited only by the following claims.

I claim:

1. In a regeneration kiln adapted to burn coke from granular particles of petroleum conversion catalyst, said kiln comprising a vertical housing adapted to contain a gravitating bed of catalyst particles having a height significantly greater than the width thereof, means for charging coked catalyst particles into the upper end of said housing, means for discharging regenerated catalyst from the lower end of said housing, means near the lower end of said housing for supplying regenerating gas to said housing, means near the upper end of said housing for withdrawing gas from said housing, whereby the gas thus supplied is caused to flow through a major portion of the vertical extent of said housing in countercurrent relation to catalyst particles descending therein, the improvement which consists of the combination of: a plurality of horizontally disposed inverted channel members having lateral louvers and being arranged to provide a solids-free space beneath said channel members; cooling coils beneath said channel members, each of said cooling coils being arranged to provide an exposed cooling surface within said solids-free space and an exposed cooling surface at said level relatively free of ascending gas; and a plurality of successive vertically spaced cooling means within said housing at intermediate levels between said means for supplying gas and said means for withdrawing gas, said cooling means serving to cool descending catalyst at said levels relatively free of ascending gas and to cool ascending gas free of catalyst and said cooling means being characterized by said channel members and said cooling coils.

2. In a regeneration kiln adapted to burn coke from granular particles of petroleum conversion catalyst, said kiln comprising a vertical housing adapted to contain a gravitating bed of catalyst particles having a height significantly greater than the width thereof, means for charging coked catalyst into the upper end of said housing, means for discharging regenerated catalyst from the lower end of said housing, means near the lower end of said housing for supplying regenerating gas to said housing, means near the upper end of said housing for withdrawing gas from said housing, whereby the gas thus supplied is caused to ascend through a major portion of the vertical extent of said housing in countercurrent relation to catalyst descending therein, the improvement which consists of the combination of a plurality of vertically spaced cooling zones at intermediate levels of said housing between said means for supplying gas and said means for withdrawing gas, each of said cooling means including a transverse plate having a plurality of downwardly extending catalyst-conducting tubes terminating at a discharge level a significant distance below said plate and providing thereby a significant vertical heat transfer surface adjacent the gas-free solids in the tubes and also providing a solids-free space beneath said plate, the sectional area of the tubes being less than half the sectional area of the housing, a plurality of horizontally disposed inverted channel members projecting upwardly from said transverse plate and having lateral louvers, and cooling coil disposal beneath said transverse plate and within said solids-free space, whereby the ascending gas is caused to flow successively through the plurality of vertically spaced cooling zones, in each of which the gas is caused to flow into said solids-free space wherein it is cooled by indirect heat exchange with said coil, and is discharged above said cooling coils from said space through said louvers, the sectional area of the solids-free space being greater than the sectional areas of the tubes.

3. A regenerating kiln as defined in claim 1 wherein said inverted channel members have vertically disposed side walls in direct heat conducting contact with said cooling coils.

4. A regenerating kiln comprising a vertical housing, means for charging coked catalyst into the upper end of said housing, means for discharging regenerated catalyst from the lower end of said housing, means near the lower end of said housing for supplying regenerating gas to said housing, means near the upper end of said housing for withdrawing gas from said housing, whereby the gas thus supplied is caused to flow through a major portion of the vertical extent of said housing in countercurrent relation to catalyst descending therein; a plurality of successive vertically spaced cooling zones within said housing at intermediate levels between said means for supplying gas and said means for withdrawing gas, each of said cooling zones including a transverse plate having a plurality of downwardly extending catalyst-conducting tubes terminating at a level below said plate and providing thereby a solids-free space beneath said plate, a plurality of horizontally disposed inverted channel members projecting upwardly from said transverse plate and having lateral louvers, and a cooling coil disposed beneath said transverse plate and within said solids-free space, each of said cooling zones being adapted for upward flow of gas in heat exchange relationship past said cooling coils.

5. A regeneration kiln comprising a vertical housing, means for charging coked catalyst into the upper end of said housing, means for discharging regenerated catalyst from the lower end of said housing, means near the lower end of said housing for supplying regenerating gas to said housing, means near the upper end of said housing for withdrawing gas from said housing, whereby the gas thus supplied is caused to flow through a major portion of the vertical extent of said housing in countercurrent relation to catalyst descending therein, said means for supplying gas including a transverse plate having a plurality of downwardly extending catalyst conducting tubes and a plurality of horizontally disposed inverted channel members superposed upon said plate; a plurality of vertically spaced cooling zones at intermediate levels of said housing between said means for supplying gas and said means for withdrawing gas, each of said zones including a plurality of horizontally disposed inverted channel members having lateral louvers and each of said channel members being arranged to provide a solids-free space beneath said member, and cooling coils in direct contact with each of said channel members and arranged to provide a cooling surface disposed within said solids-free space, each of said channel members being adapted for upward flow of gas through said solids-free space and past said cooling coils, whereby the downwardly moving catalyst is subjected to a plurality of vertically spaced cooled streams of gas.

References Cited in the file of this patent

UNITED STATES PATENTS

| | | |
|---|---|---|
| 731,682 | Hillig | June 23, 1903 |
| 1,995,292 | Clark | Mar. 26, 1935 |
| 2,389,493 | Evans | Nov. 20, 1945 |
| 2,440,475 | Jacomini | Apr. 27, 1948 |
| 2,464,257 | Pelzer et al. | Mar. 15, 1949 |
| 2,469,329 | Crowley | May 3, 1949 |
| 2,506,545 | Crowley | May 2, 1950 |
| 2,537,272 | Kassel | Jan. 9, 1951 |